United States Patent

[11] 3,581,569

[72] Inventor Jay I. Black
Orange, Conn.
[21] Appl. No. 880,528
[22] Filed Nov. 28, 1969
[45] Patented June 1, 1971
[73] Assignee Avco Corporation
Stratford, Conn.

[54] MOUNTING OF FLUIDIC TEMPERATURE SENSOR IN GAS TURBINE ENGINES
7 Claims, 3 Drawing Figs.

[52] U.S. Cl. .................................................. 73/346,
73/349, 415/115, 416/96
[51] Int. Cl. ................................................. G01k 13/02,
G01k 11/26
[50] Field of Search ............................................ 73/343, 339
A, 346, 349, 357; 416/95, 96; 415/115; 60/39.28

[56] References Cited
UNITED STATES PATENTS
2,625,367   1/1953   Rainbow ..................... 415/115

3,348,414   10/1967   Waters ........................ 73/343X
3,491,797   1/1970   Taplin ......................... 73/349X
FOREIGN PATENTS
1,512,875   2/1968   France ......................... 73/339

Primary Examiner—Louis R. Prince
Assistant Examiner—Denis F. Corr
Attorneys—Charles M. Hogan and Gary M. Gron ABSTRACT: Fluidic oscillator positioned in the interior of a turbine nozzle vane used in a gas turbine engine. The inlet to the oscillator is connected to the leading edge of the vane and the outlet is connected to a throat portion in the nozzle so as to be at a lower pressure level. A closed tube extends from the oscillator to an exterior location where a transducer provides a signal output proportional to pressure oscillations in the sensor as a function of the gas temperature passing across the turbine nozzle.

PATENTED JUN 1 1971
3,581,569
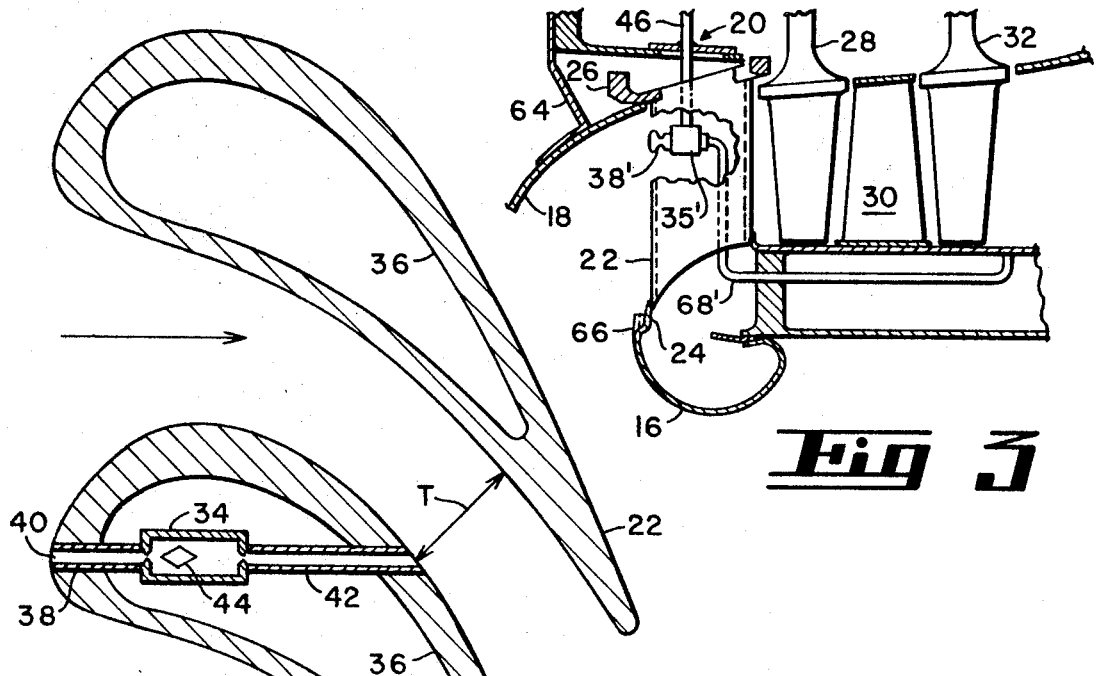
Fig 3
Fig 2
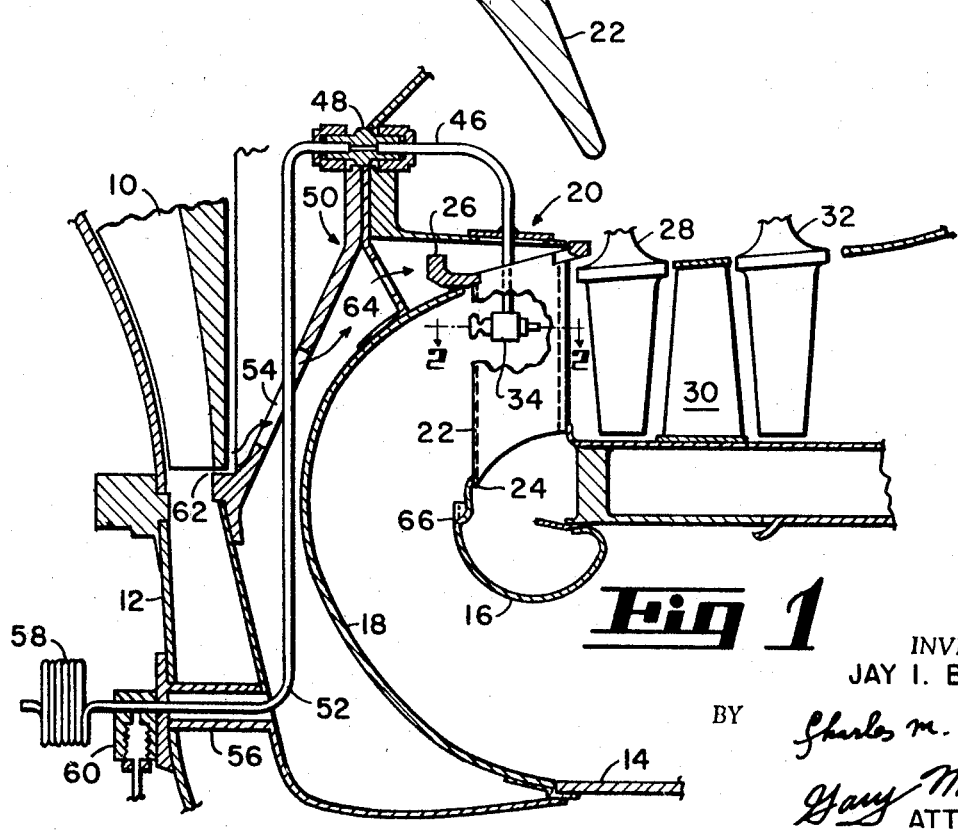
Fig 1
INVENTOR.
JAY I. BLACK
BY Charles M. Hogan
Gary M. Gron
ATTORNEYS.

MOUNTING OF FLUIDIC TEMPERATURE SENSOR IN GAS TURBINE ENGINES

The present invention relates to fluidic temperature sensors and more specifically to a mounting for a sensor of this type in a gas turbine engine.

For a number of years the actual measurement of the turbine inlet temperature of a gas turbine engine has been a sought after objective. This is because the turbine inlet temperature must be held at a level which is high enough to promote good efficiency but to stay within the limits of the material temperature capabilities.

Fluidic oscillations have been proposed for this purpose. Briefly, they comprise a resonant chamber which has an inlet orifice connected to the gas, whose temperature is to be measured, and an outlet orifice connected to a low pressure discharge. A splitter within the chamber promotes an oscillation of the fluid in the chamber and this oscillation is directly proportional to the temperature of the gas passing through the oscillator.

One of the problems in using the fluidic oscillator for turbine inlet temperatures of over 2,000°, common to high-performance gas turbine engines, is that the oscillator will quickly deteriorate through prolonged exposure to the hot gas stream. Another problem is that the oscillator assembly tends to disturb the normal flow path through the engine and impair efficiency.

Accordingly, it is an object of the present invention to provide a mounting arrangement for a fluidic oscillator and a gas turbine engine which will enable prolonged use of the oscillator to measure elevated gas temperatures and will have a minimum effect on the efficiencies of the engine.

In one aspect of the invention these ends are achieved by providing a fluidic oscillator of the above general type in a cooling passage of a turbine inlet nozzle vane. The inlet of the oscillator is connected to an upstream portion of the vane and the outlet to a lower pressure discharge. Thus, the turbine inlet temperature is measured while the body of the fluidic oscillator is kept at a temperature which permits prolonged operation.

The above and other related objects and features of the present invention will be apparent from a reading of the description of the disclosure found in the accompanying drawing and the novelty thereof pointed out in the appended claims.

In the drawing:

FIG. 1 is a longitudinal section view of a mounting for a fluidic temperature sensor embodying the present invention along with the cooperating portions of a gas turbine engine.

FIG. 2 is a greatly enlarged view of the fluidic oscillator shown in FIG. 1 and taken on lines 2—2 of FIG. 1.

FIG. 3 is an alternate mounting for a fluidic temperature sensor embodying the present invention.

Referring to FIG. 1 there are shown those portions of a gas turbine engine with which the present invention is concerned. For complete details of a type of engine with which the present invention may be employed, see U.S. Pat. No. 3,088,278 in the name of Anselm Franz, issued May 7, 1963, entitled "Gas Turbine Engine" and of common assignment with the present invention. However, for purposes of explaining the present invention, the engine components shown in FIG. 1 are sufficient.

In FIG. 1 a compressor, including a last-stage centrifugal impeller 10, discharges air to a diffuser assembly 12 which discharges the air into a combustor assembly 14, only the aft end of which is shown. A suitable fuel nozzle injects fuel into the combustor and the mixture is ignited by suitable means well known in the art to provide a propulsive hot gas stream. The hot gas stream is discharged from the combustor 14 to a turning duct assembly comprising inner and outer annular members 16 and 18.

The downstream end of the turning duct assembly discharges across a turbine nozzle assembly 20. The turbine nozzle assembly comprises a series of radial vanes 22 secured to inner and outer annular support members 24 and 26 and shaped to form converging, diverging flow paths. For normal operation of the engine the minimum flow area section, or throat T, of the turbine nozzle assembly is choked.

From the turbine nozzle assembly 20 the hot gas stream expands across a first stage 28 of a turbine assembly, an interstage vane assembly and a second stage of the turbine assembly. From there the hot gas stream passes to a power turbine for providing a rotatable output or through a jet nozzle to provide a reaction propulsion thrust.

A path for cooling air through vanes 22 is provided by passageways 36 in the vanes. These passageways are supplied with cooling air through a gap 62 at the periphery of the compressor impeller 10 which permits a metered flow of pressurized air to pass through ports 54 and 62 in an engine frame assembly 50 and into the radially inward end of vane 22. From there the air flows longitudinally through the passageways 36 in vanes 22 and may be, in part, discharged through various openings in the vanes to cool the outer surface thereof. At the radially outward end of the vanes 22 the air is discharged through perforations 66 in the duct assembly 16 to the gas stream entering the turbine nozzle assembly to cool leading edges of the vanes 22.

A fluidic oscillator, generally indicated by reference character 35, comprising a resonant chamber 34 is positioned in the cooling passageway 36 for one of the vanes 22. The oscillator has an inlet tube 38, including an orifice, extending to an upstream portion 40 of the turbine nozzle vane. As shown herein, the tube 38 extends to the leading edge of vane 22. However, for other applications the end of tube 38 may be placed in the upstream convex side of vane 22 to minimize contamination of the oscillator 35 by foreign objects. An outlet tube 42, including a second orifice, extends to the convex side of the vane 22 and, as herein shown, discharges at the throat T of the turbine nozzle assembly. A splitter element 44 is positioned in the chamber 34 to produce acoustical pressure waves whose frequency of oscillation is dependent substantially on the temperature of the gas entering the chamber 34 from the inlet tube 38, as is well known in the art.

A tube 46 extends from the chamber 34 out of the vane 22 to a connector assembly 48 positioned in the frame assembly 50 of the engine. A series-connected tube 52 extends from the connector assembly 48 through the opening 54 and through a hollow strut 56 in the compressor diffuser to a closed end signal-attenuating coil assembly 58. A pressure transducer 60 is connected to the line 52. The transducer 60 is adapted to provide an electrical signal output in response to the pressure oscillations in tube 52. The transducer may be one of a number of transducers well known in the art that may be employed for this purpose. The transducer 60 is calibrated so that its output is directly proportional to the temperature of the gas entering the inlet tube 38 of the fluidic oscillator.

During operation of the engine, a pressure differential exists across the inlet and outlet ports of the fluidic oscillator. This causes a flow through the resonant oscillator chamber 34 and the splitter 44 causes pressure oscillations which are proportional to the temperature of the gas flowing through the oscillator 35. The temperatures that the oscillator senses are extremely high and prolong exposure of the chamber 34 and inlet and outlet tubes 38 and 42 would cause them to deteriorate. However, the cooling air which passes over the fluidic oscillator maintains its temperature at a level which enables prolonged operation in sensing the hot gas temperatures at the inlet of the turbine nozzle without significant deterioration. In addition, the placement of the sensor inside a turbine nozzle vane minimizes the effect of the sensor on the performance of the engine.

As illustrated in FIGS. 1 and 2, the sensor inlet and outlet are positioned entirely within the vanes. The inlet 38 is exposed to the total pressure of the gas stream entering the turbine nozzle and the outlet port is exposed to the pressure at the throat in the nozzle assembly which is the lowest pressure existing in the turbine nozzle assembly. This pressure ratio is generally sufficient to provide acceptable results in the measurement of temperature by the oscillator.

The arrangement of FIG. 3, however, may be employed to produce even more accurate results. In this figure a modified fluidic oscillator 35' is positioned in a vane 22. The inlet 38' extends to the leading edge of the vane 22 but an outlet port 68 extends longitudinally through the vane 22 and discharges downstream of the turbine assembly. This downstream pressure is substantially lower than the pressure at the throat T in the turbine nozzle and it insures that the fluidic oscillator is choked throughout the normal operating ranges of the engine, thereby making the oscillator more accurate at lower engine operating speeds.

The oscillator described above is a highly compact and reliable assembly that may be employed with particular advantage in gas turbine engines. However, it may be employed to measure other hot gas streams with equal advantage. Accordingly, the scope of the invention should be determined solely by the appended claims.

Having thus described the invention, what I claim as novel and desire to be secured by Letters Patent of the United States is:

1. A fluidic temperature sensor assembly for a gas turbine engine, said assembly comprising:
    an aerodynamic vane extending across a hot fluid stream in said gas turbine;
    means for providing a cooling-air passageway through said vane;
    a fluidic oscillator having an oscillating chamber positioned in said cooling passageway means and having an inlet extending to an upstream portion of said vane and an outlet extending to a discharge point at a pressure lower than the pressure at said inlet; and
    means for sensing the pressure oscillations in said fluidic oscillator as a function of the temperature of said fluid stream.

2. A fluidic temperature sensor as in claim 1 wherein said aerodynamic vane comprises a vane of a plurality of vanes comprising an inlet nozzle for a turbine assembly, whereby said fluidic temperature sensor senses turbine inlet temperature.

3. A fluidic temperature sensor as in claim 2 wherein said turbine nozzle vanes are shaped to provide converging, diverging passageways through said turbine nozzle to provide a choked condition at a throat portion and wherein said inlet extends to the leading edge of said vane and said outlet extends to the throat portion of said turbine nozzle, thereby providing said low-pressure discharge.

4. A fluidic temperature sensor as in claim 2 wherein said outlet extends to a point downstream of said turbine assembly.

5. A fluidic temperature sensor as in claim 2 wherein the means for sensing the pressure oscillations in said chamber comprises:
    an elongated closed tube connected to said chamber and extending away from said turbine nozzle vanes;
    a transducer exposed to pressure oscillations in said tube for providing a signal output as a function of the pressure oscillations in said chamber.

6. A gas turbine engine comprising:
    a compressor for pressurizing a source of air;
    a combustor for receiving pressurized air from said compressor and for generating a hot gas stream;
    a turbine assembly downstream of said combustor and having a turbine inlet nozzle through which said hot gas stream passes, said turbine nozzle comprising a plurality of radially extending hollow vanes;
    means for providing a flow path for pressurized cooling air from said compressor through the interior of said vanes;
    a fluidic oscillator connected to the hot gas stream passing through said turbine nozzle and being positioned in the interior of said vanes, whereby the exterior of said fluidic oscillator is maintained at the temperature of said cooling air; and
    means exterior of said turbine nozzle assembly for providing a signal output proportional to the pressure oscillations in said fluidic oscillator.

7. A gas turbine engine as in claim 6 wherein said fluidic oscillator comprises:
    a chamber positioned in the interior of one of said turbine nozzle vanes and having an inlet extending to the leading edge thereof and an outlet extending to a throat portion in said turbine nozzle assembly;
    said means for providing a signal output comprises a closed tube connected to said oscillating chamber and extending away from said turbine nozzle assembly and a transducer connected to said tube for providing a signal output proportional to the oscillations in said tube.